United States Patent

Chszaniecki

[11] 4,315,440
[45] Feb. 16, 1982

[54] DOUBLE SCREW EXTRUDER TRANSMISSION

[75] Inventor: Siegfried Chszaniecki, Hanover, Fed. Rep. of Germany

[73] Assignee: Hermann Berstorff Maschinenbau GmbH, Fed. Rep. of Germany

[21] Appl. No.: 83,324

[22] Filed: Oct. 10, 1979

[30] Foreign Application Priority Data

Dec. 4, 1978 [DE] Fed. Rep. of Germany ....... 2852445

[51] Int. Cl.³ ..................... F16H 37/06; F16H 57/00; F16H 3/44
[52] U.S. Cl. ................................. 74/665 G; 74/410; 74/665 GA; 74/789
[58] Field of Search ............. 74/410, 665 G, 665 GA, 74/665 F, 406, 789

[56] References Cited

U.S. PATENT DOCUMENTS

| 959,826 | 5/1910 | Willi | 74/106 |
|---|---|---|---|
| 2,144,964 | 1/1939 | De Falco | 74/406 |
| 2,231,784 | 2/1941 | von Thungen | 74/410 X |
| 2,460,428 | 2/1949 | O'Leary | 74/801 |
| 2,551,659 | 5/1951 | Emrick | 74/665 GA |
| 2,905,011 | 9/1959 | Armstrong et al. | 74/665 GA X |
| 3,315,547 | 4/1967 | Fritsch | 74/410 X |
| 3,465,800 | 9/1969 | Michaelis | 74/665 GA X |
| 3,824,875 | 7/1974 | Willert et al. | 74/410 |
| 3,897,696 | 8/1975 | Schroder et al. | 74/665 GA X |
| 4,136,580 | 1/1979 | Brand et al. | 74/410 |
| 4,158,967 | 6/1979 | Vatterott | 74/410 |

FOREIGN PATENT DOCUMENTS

| 691228 | 5/1940 | Fed. Rep. of Germany | 74/665 GA |
| 1950639 | 4/1971 | Fed. Rep. of Germany. | |
| 83548 | 6/1935 | Switzerland | 74/665 GA |

Primary Examiner—Leslie Braun
Attorney, Agent, or Firm—Schwartz, Jeffery, Schwaab, Mack, Blumenthal & Koch

[57] ABSTRACT

A transmission for two driven shafts which are parallel to and at a small spacing from one another and which drive the twin screws of the extruder wherein each shaft has a respective driven pinion thereon with the two pinions axially displaced with respect to one another and for each pinion there is a respective drive each comprising three intermediate gears equiangularly disposed around the pinion and meshed therewith, a ring gear surrounding and meshed with the three intermediate gears and drive means to rotate the ring gear, the pinion and two of the three intermediate gears not having any mountings, i.e. floating, and the third intermediate gear being free to move in directions radially of the pinion thereby to obtain equal division of drive power between the three intermediate gears and avoid forces tending to move the pinion radially.

2 Claims, 3 Drawing Figures

DOUBLE SCREW EXTRUDER TRANSMISSION

The invention relates to transmissions for double-screw extruders.

One difficulty in double-screw extruders lies in transmitting high torque values to the driven pinions of the driven shafts which extend parallel to and closely beside one another. In order to make it possible to transmit high torque, various kinds of double-screw extruder transmissions which provide for power branching or division have already been disclosed or proposed.

One proposal known from FIG. 4 of German published Application No. 19 50 639, has supported driven shafts carrying respective driven pinions with the two driven pinions in relatively axially displaced positions. In this arrangement, each driven pinion is surrounded by three supported intermediate gears with the three intermediate gears equiangularly spaced around the respective driven pinion. This is intended to provide the advantage that the radial forces applied to the pinion and caused by tooth engagement cancel each other out. The intermediate gears rotate on spindles the positions of which are fixed and simultaneously drive the respective driven pinion. Thus, three regions of tooth engagement on each driven pinion are used simultaneously for the purposes of transmitting force thereto. The intermediate gears are in turn driven by a ring gear disposed therearound with the ring gear in turn driven by a spur gear engaging an external tooth configuration on the ring gear. In this arrangement, the ring gear must also be supported.

This known proposal suffers from the disadvantage that the tooth engagement on the pinions cannot be uniform as the distances between the axes of the intermediate gears and the driven pinions, and also the tooth shapes, vary due to production tolerances. Such tolerances cannot be excluded and can only be kept at a low level with considerable technical cost.

However, the consequence of such production tolerances is that the radial forces caused by the tooth engagement areas cannot cancel each other out completely. Therefore, the radial mountings of the driven shafts are subjected to high loadings. The transmission of the respective torque components to the respective driven pinion is not uniform, because of the production tolerances. Uniform division of the power to be transmitted is not possible with this double-screw extruder transmission.

The invention is based on the problem of providing a double-screw extruder transmission generally of the kind described above but which permits automatic adjustment in position of the gears of the transmission for the purposes of achieving uniform division of the power to be transmitted, by uniform tooth engagement on the respective gears, and which substantially reduces the technical cost of the transmission structure.

According to the invention, there is provided a double-screw extruder transmission comprising two driven shafts which are parallel to and at a small spacing from one another and which each carry a respective non-rotatably connected driven pinion, the two driven pinions being axially displaced relative to one another, two sets of three intermediate gears, one for each of the two driven pinions, the three intermediate gears being meshed with the respective driven pinion and equiangularly spaced therearound, a pair of ring gears mounted in a transmission housing, each surrounding and being meshed with a respective one of the sets of intermediate gears and located coaxially with the respective driven pinion and drive means for the ring gears, wherein each of the driven pinions and two of the gears of each set of three intermediate gears are disposed without mountings and the third gear of each set of intermediate gears is mounted so as to be displaceable in directions radially of the respective driven pinion.

Such an arrangement of floating intermediate gears can provide, by virtue of their automatic uniform disposition, for centering of the respective driven pinion. The radial forces of the three tooth engagement areas between the pinion and the three intermediate gears cancel each other out, as the intermediate gears and the respective pinion automatically adjust themselves to provide uniform division of the power to be transmitted. The same tooth pressure is produced for all three engagement regions on the pinion, irrespective of the production tolerances on the gears and the distances between the axes thereof. As mountings for the driven pinion and two of the three intermediate gears are not required, manufacture can be considerably facilitated.

Advantageously each said third gear is radially displaceable by mounting it on a shaft journal located in a guide fork secured to the transmission housing.

The invention can make it possible for the first time to provide for uniform transmission of high torque values with a plurality of tooth engagement areas, ensuring that each tooth engagement transmits the same proportion of the output torque required. Thus, there is no risk of damage to mountings or supports and high costs for providing such mountings or supports, for the transmission gears can be avoided. Uniform division of the power to be transmitted can always be achieved, irrespective of the manufacturing tolerances in the respective gears of the transmission.

The invention is diagrammatically illustrated by way of example in the accompanying drawings, in which.

Figure 1:
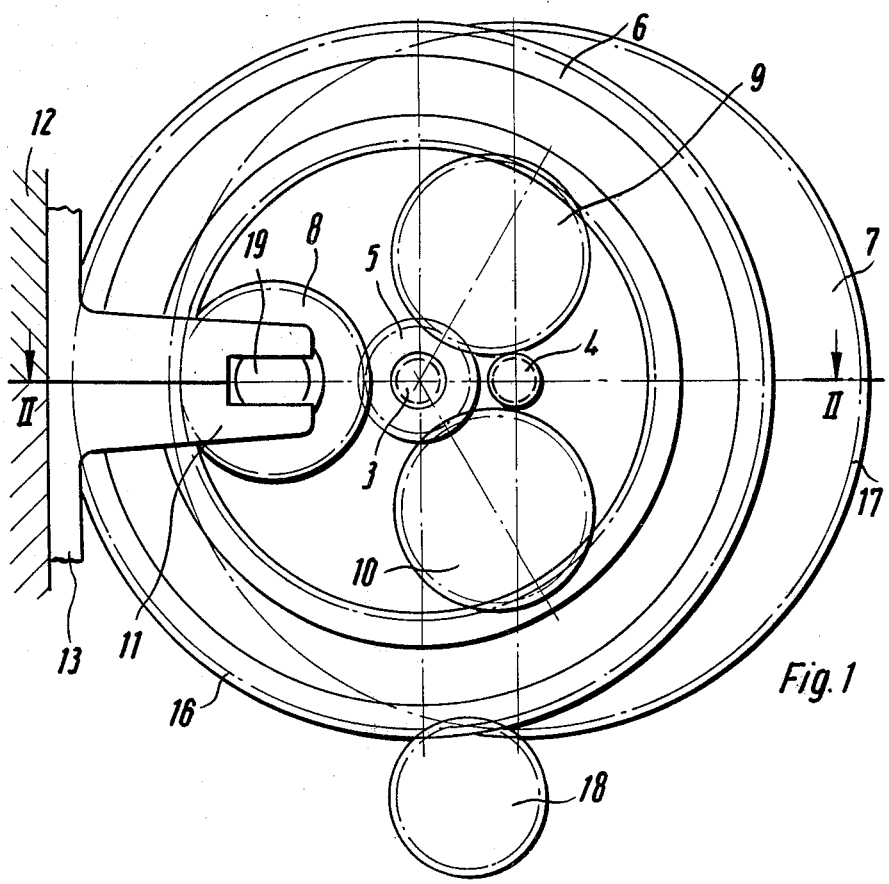
FIG. 1 shows a side view of a double-screw extruder transmission according to the invention.
Figure 2:
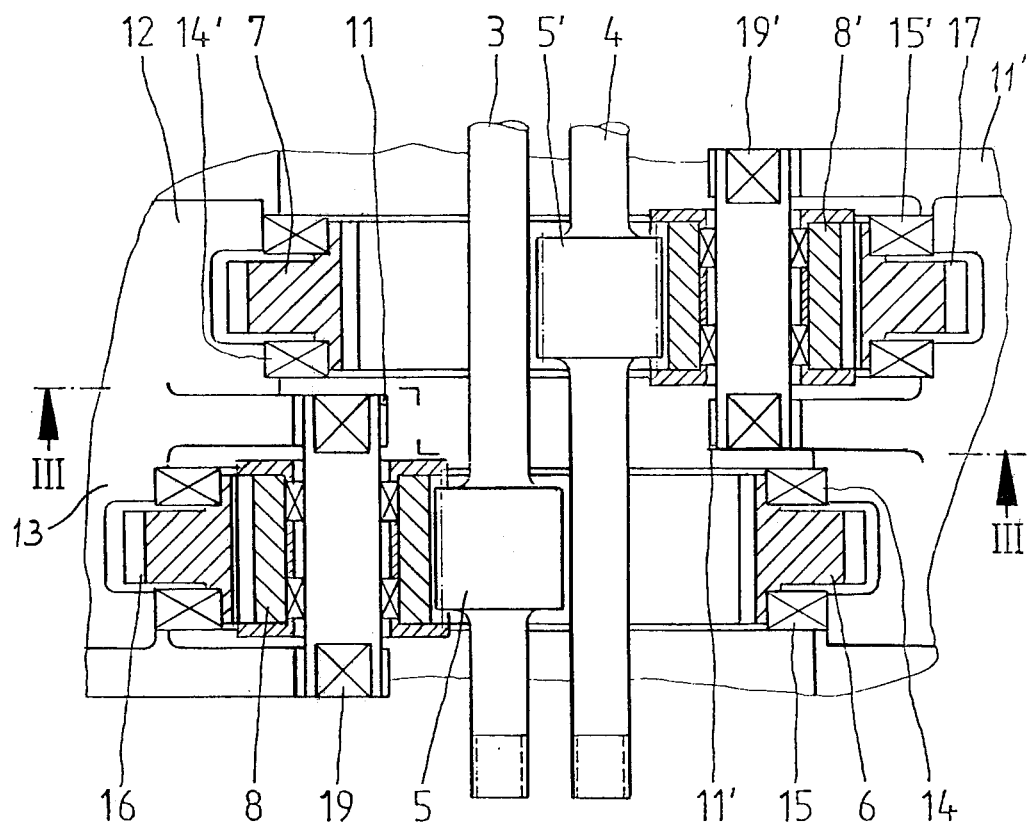
FIG. 2 shows a plan view of the double-screw extruder transmission of FIG. 1, in cross-section taken along line II—II of FIG. 1.
Figure 3:
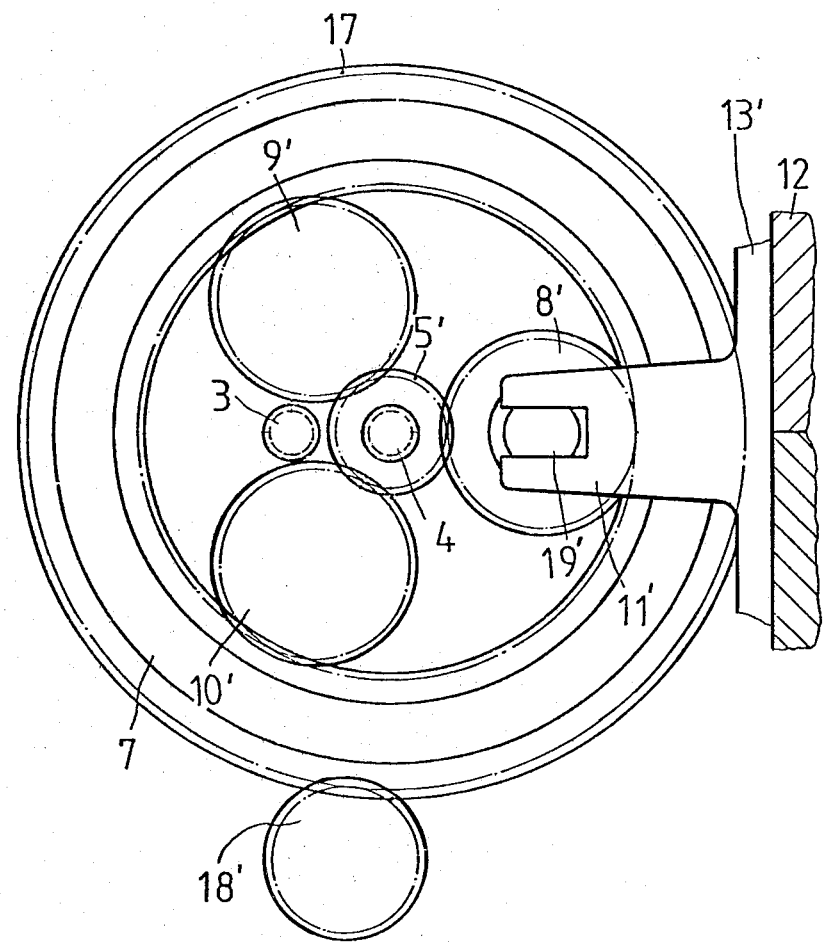
FIG. 3 is a view similar to FIG. 1, showing the second, axially displaced rearward driven piston.

Referring to the drawings, a pair of drive shafts 3, 4 to drive the screws of a double-screw extruder are disposed parallel to and at a small spacing from one another. The shafts 3 and 4 each carry a respective driven pinion 5 and 5′. The pinions 5 and 5′ are disposed coaxially with respective ones of ring gears 6 and 7 of larger diameter. Only a forward transmission arrangement for the forward one of the pinions 5 and the associated ring gear 6 is described hereinafter, as the transmission arrangement for the rearward one of the driven pinions 5′ carried by the shaft 4 at a position axially displaced from the position of the forward one of pinions 5, and the associated ring gear 7, are of the same construction. However, the transmission arrangement for the pinion 5′ is illustrated in FIG. 2, with the same reference numerals being employed with an attached prime. FIG. 3 also shows the transmission arrangement for pinion 5′, with the numerals similarly be given an attached prime.

The pinion 5 on the drive shaft 3, which is connected to one of the two screws of the extruder (not shown in the drawing), the two screws being disposed one beside the other and parallel to one another, is engaged with three intermediate gears 8, 9 and 10, two of which gears 9 and 10 are disposed without support mountings. The intermediate gear 8 is mounted in a radially displaceable manner, by means of a shaft journal 19 located in a guide fork 11 of housing support means 13 which is flanged onto a transmission housing 12. The intermediate gears 8, 9 and 10 are disposed at equiangular spacings within the ring gear 6 with internal teeth of which they mesh and which is mounted rotatably in the transmission housing 12 in radial bearings 14 and 15.

The two ring gears 6 and 7 of the transmission arrangement each have an array of external teeth 16, 17 respectively which mesh with a respective spur gear 18 and are driven thereby.

When the transmission is subjected to load, the intermediate gears 8, 9 and 10 and the respective driven pinion 5 adjust in such a way that the three tooth engagements therebetween, which provide for the transmission of power, are uniform. The driven torque which is thus required on the respective shafts 3 and 4 is thus uniformly divided up between the three tooth engagement regions. The same comments apply to pinion 5' and intermediate gears 8', 9' and 10'. This uniform division of power to be transmitted makes it possible for a high torque value to be transmitted to the parallel driven shafts 3, 4 of the two extruder screws, which are disposed one beside the other at a small spacing from each other, and also makes it possible for the manufacturing cost of the transmission to be kept at a low level.

What is claimed is:

1. A double-screw extruder transmission comprising two driven shafts which are parallel to and at a small spacing from one another, a respective driven pinion on each of said two driven shafts and secured against rotation with respect thereto, said two driven pinions being axially displaced relative to one another, two sets of three intermediate gears, one for each of said two driven pinions, each of said sets of three intermediate gears being meshed with a respective one of said driven pinions and equiangularly spaced therearound, a pair of ring gears, a transmission housing mounting said pair of ring gears, each of said ring gears surrounding and being meshed with a respective one of said sets of intermediate gears and located coaxially with the respective one of said driven pinions and drive means for said ring gears, wherein each of said driven pinions and two of the gears of each of said sets of three intermediate gears are disposed without mounting and the third gear of each of said sets of intermediate gears is mounted so as to be displaceable in directions radially of the respective one of said driven pinion, all of said gears of said sets of intermediate gears being capable of floating relative to each other and relative to said driven pinions so as to uniformly transmit power to said driven pinions.

2. A double-screw extruder transmission as claimed in claim 1, wherein each said third gear is radially displaceable by mounting it on a shaft journal located in a guide fork secured to said transmission housing.

* * * * *